July 4, 1961 P. ZERNOV ET AL 2,990,729
METHOD AND APPARATUS FOR STRAIGHTENING
AND HONING DOCTOR BLADES
Filed May 2, 1960 4 Sheets-Sheet 1

INVENTORS
PETER ZERNOV
ROBERT R. TRAUPMANN
BY
Lieber, Lieber & Nilles
ATTORNEYS

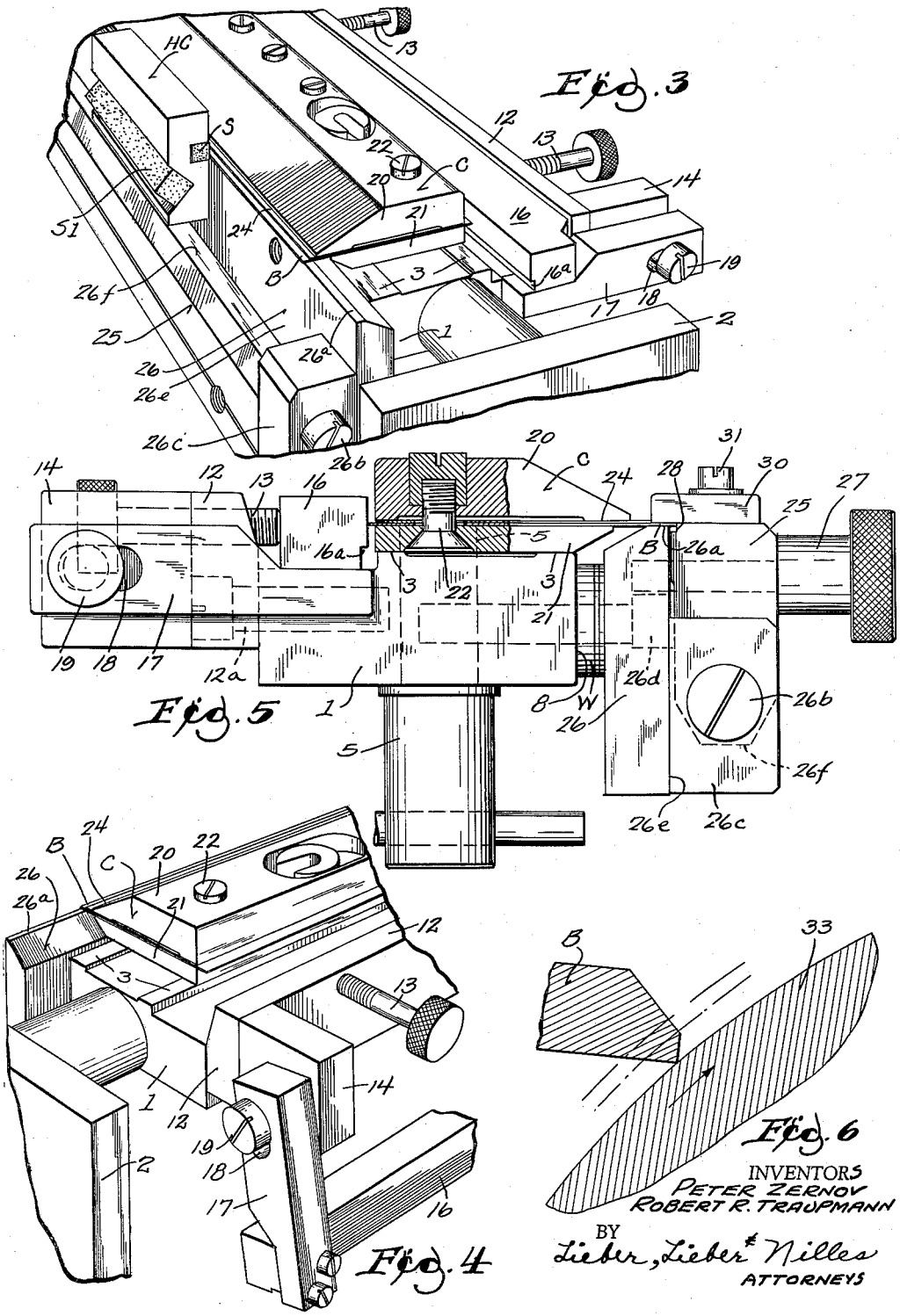

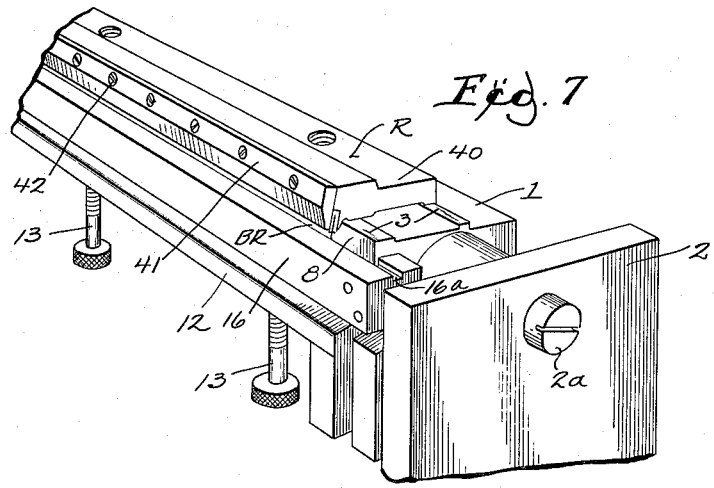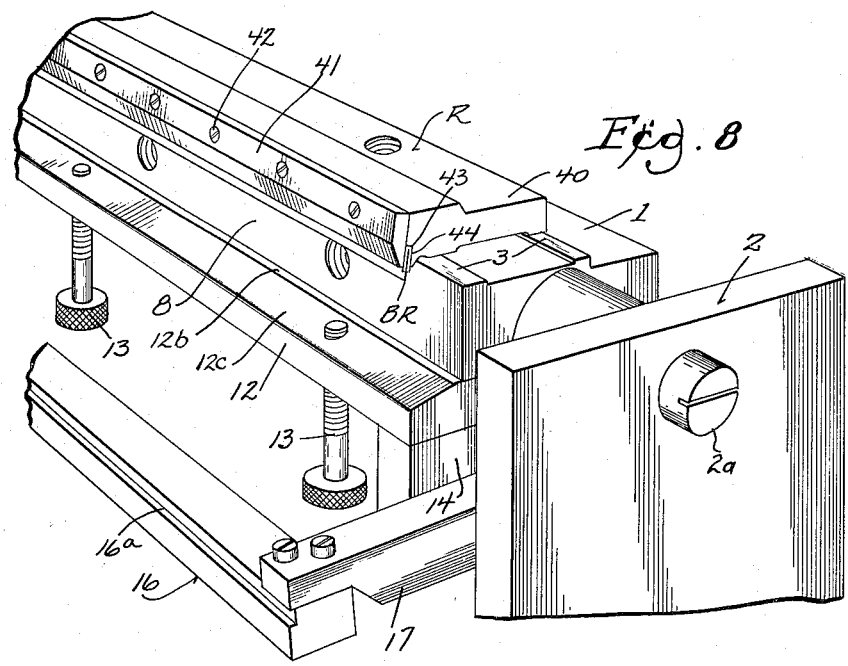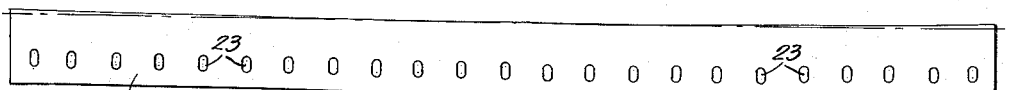

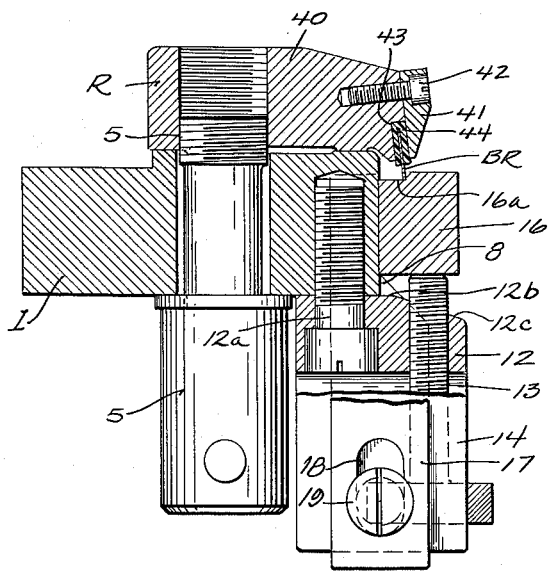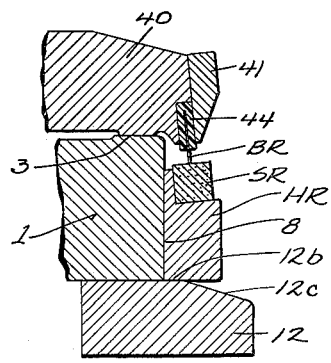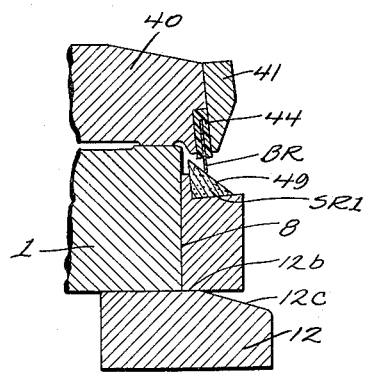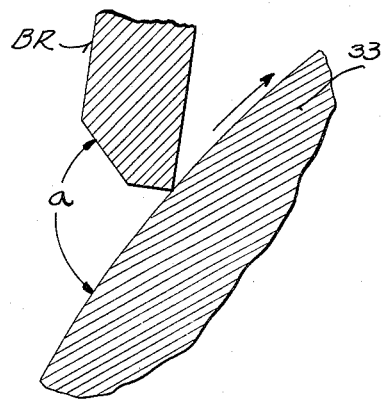
July 4, 1961 P. ZERNOV ET AL 2,990,729
METHOD AND APPARATUS FOR STRAIGHTENING
AND HONING DOCTOR BLADES
Fig. 9
Fig. 10
Fig. 10A
Fig. 11
INVENTORS
PETER ZERNOV
ROBERT R. TRAUPMANN
BY
Lieber, Lieber & Nilles
ATTORNEYS

United States Patent Office 2,990,729
Patented July 4, 1961

2,990,729
METHOD AND APPARATUS FOR STRAIGHTENING AND HONING DOCTOR BLADES
Peter Zernov and Robert R. Traupmann, Milwaukee, Wis., assignors to Mercury Engineering Corporation, Milwaukee, Wis., a corporation of Wisconsin
Filed May 2, 1960, Ser. No. 26,142
9 Claims. (Cl. 76—101)

This invention relates generally to rotary printing presses or the like and more particularly to a method and apparatus for straightening and honing doctor blades for such presses.

Doctor blades which are used with printing presses are usually made from very hard steel strips which are on the order of from 0.006 to 0.012 inch in thickness. These strips are formed by the steel mill by a drawing operation and consequently the edge of the blade is very smooth as it is delivered to the paper converting machinery manufacturers.

Although the blade edge has a very desirable degree of smoothness, it has heretofore been necessary for the machinery manufacturer to rework this edge by a shearing, grinding or other mutilating operation in order to insure that the edge is exactly straight and consequently an even wiping pressure is applied to the cylinder along the entire length of the blade. More specifically, as the blade comes from the mill, it usually has a certain amount of camber or "bow" to it, that is, it is of a gently curved shape along its length, and the blade has heretofore been straightened by removing a portion of the original smooth edge by one type of operation or the other.

In addition to this straightening process, it is also necessary to remove a portion of the wiping edge of the blade, as by honing, so as to form an angle or bevel therealong. Thus while the original thickness of the blade is perhaps from 0.006 to 0.012 inch, after the honing operation only about 0.002 of an inch of thickness remains along the finished edge. Due to the particular angle of attack of the blade in respect to the cylinder periphery and the wear of the blade when in use, it is imperative that the angle honed on the blade edge is precisely uniform along the length of the blade. This uniformity is essential in order that an even wiping pressure and action exists along the length of the blade as the blade wears when in use, and also in order to extend the life of the blade before a rehoning operation is required.

Therefore, two of the prime requisites for a properly formed doctor blade are straightness and uniformity of the honed angle along its wiping edge.

In accordance with the present invention, a set-up apparatus and a method have been provided for straightening and honing a doctor blade, by means of which the normally cambered blade is straightened without the necessity of shearing, grinding or otherwise removing the smooth edge of the blade as delivered by the steel mill. The invention contemplates the use of a perfectly straight guide surface against which the blade is urged and then tightened into position within its holder. In this manner the camber or "bow" of the blade is removed with the application of a relatively small amount of pressure. The blade is preferably tightened in such a direction in respect to the direction in which the blade was originally bowed, so that the wiping edge of the finally finished blade is placed in tension. By means of the present invention the blade may be straightened to within a variation of 0.002 of an inch along its length.

Another aspect of the invention contemplates that after the blade is straightened, it is then honed with its required angle while it is still in the same straightening apparatus, and the honing tool utilizes the same straight guiding surfaces that were used to mount the straightening bar. As a result, the finished blade has a uniform angle formed on its wiping edge and is also of a uniform thickness. Consequently, as the blade wears in use, its working angle does not change appreciably and longer periods of use are possible between rehoning operations.

In accordance with another and important aspect of the present invention, essentially the same set-up apparatus can be used for both "conventional" and "reverse" wipe type of blades. Heretofore, the use of a reverse wipe blade has been severely restricted due to the lack of ability to properly form the wiping edge, and the present invention is particularly practical and important in these respects.

These and other objects and advantages of the invention will appear as this disclosure progresses, reference being had to the accompanying drawings, in which:

FIGURE 3 is a view generally similar to FIGURE 2 but showing the straight gauge edge removed and a honing block in position;

FIGURE 4 is a rear, perspective, fragmentary view of the above device, but showing the pressure transmitting bar swung downwardly to an inoperative position;

FIGURE 5 is an end elevational view of the device as shown in FIGURE 1, certain parts being broken away, removed or in section for clarity;

FIGURE 6 is an enlarged sectional view of the conventional blade in relation to its printing cylinder;

FIGURE 7 is a perspective view of a reverse wipe blade and holder as set up in the straightening device;

FIGURE 8 is a view similar to FIGURE 7, but on a slightly enlarged scale, and showing the pressure transmitting bar as swung downwardly to an inoperative position;

FIGURE 9 is an end elevational view of the device as shown in FIGURE 7, parts being broken away or in section for clarity in the drawing;

FIGURE 10 is an end elevational view of the device shown in FIGURE 9, but with the pressure bar removed and the honing block in position;

FIGURE 10a shows another type of honing stone for forming the blade angle;

FIGURE 11 is an enlarged sectional of the reverse wipe blade in relation to its associated printing cylinder;

FIGURE 12 is a plan view of a typical blade, on a smaller scale, as it comes from the steel mill.

Figure 1:
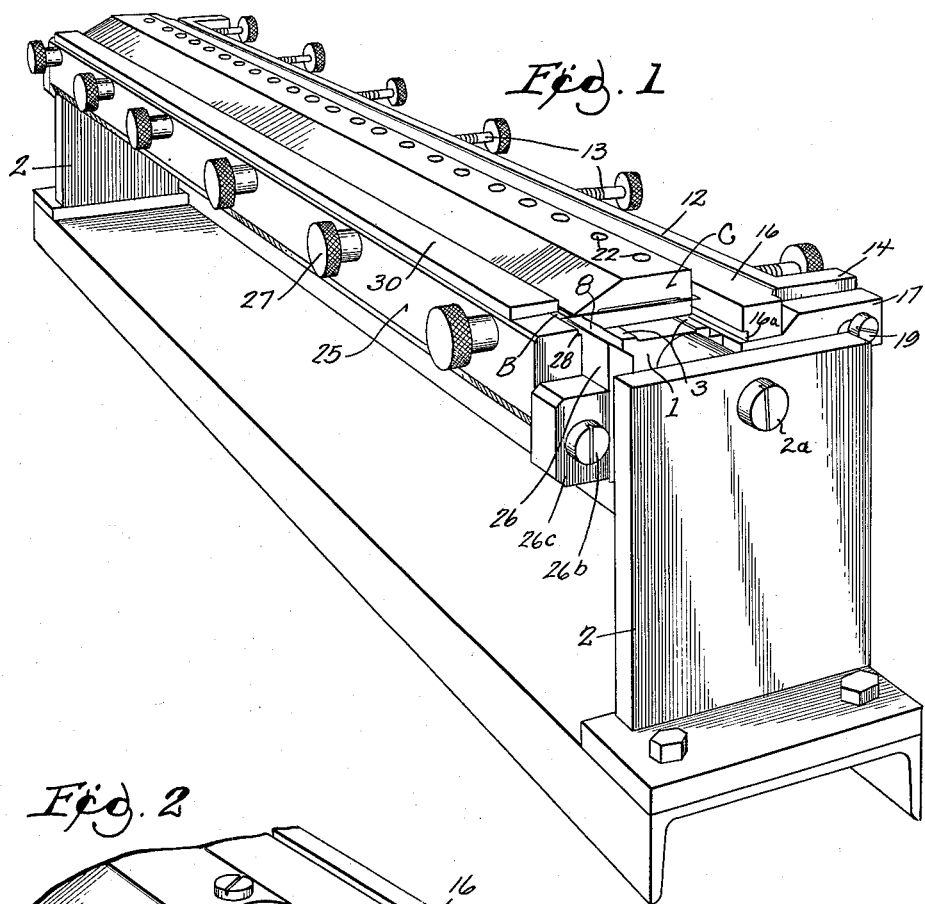
FIGURE 1 is a perspective view of a conventional wipe blade and holder as set up in a straightening and honing device by means of which the present invention may be practiced.
Figure 2:
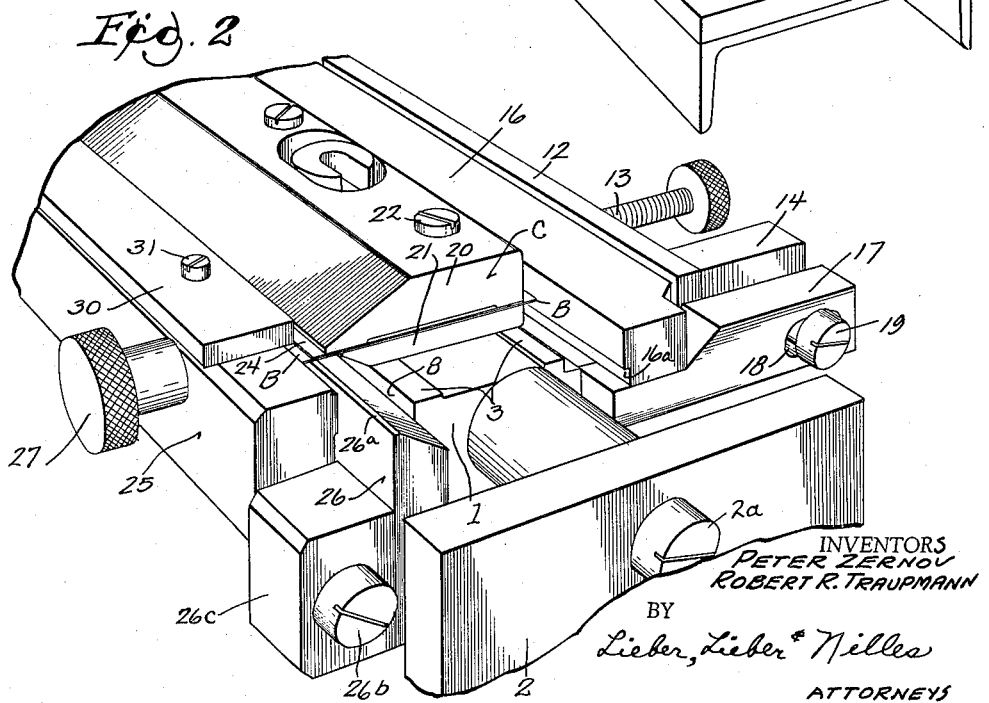
FIGURE 2 is an enlarged view of a portion of the device as shown in FIGURE 1.

Referring in greater detail to the drawings, a base 1 is rigidly mounted in a support frame 2, but when the screws 2a, one at each side, are loosened, the frame is pivotable from the position shown in FIGURES 1 and 2 to a position 90 degrees in a clockwise direction. The latter position (not shown) may be preferred when working with the reverse wipe blade shown in FIGURES 7-10a. The base has a pair of smooth mounting surfaces 3 on which either the conventional wipe blade holder C (FIGURES 1-6) or the reverse blade holder R (FIGURES 7-10) may be secured by the bolt means 5 extending through the base. The base also has a vertically disposed surface 8 along its front side, which surface is accurately formed so as to be straight, flat and smooth.

When the apparatus is used with a conventional wipe blade, as illustrated in FIGURES 1 to 6, a member 12 is rigidly secured by bolts 12a along the rear side of base 1. A series of pressure transmitting screws 13 threadably extend through member 12 and a mounting block 14 extends rearwardly from each of the ends (only one shown) of this member. A pressure transmitting bar 16 is swingably mounted on blocks 14 by its two arms 17 (only one shown), one of which is secured at each end of the bar. These arms have slots 18 through which extend the pins 19 that are threaded into the blocks 14. Thus, the pressure bar 16 is swingable in respect to the base between the non-operative FIGURE 4 position and the pressure applying position shown in FIGURES 1, 2 and 3. Because of its slotted connection with the base, when the bar is in the FIGURES 1, 2 and 3 position, the inner ends of the screws 13 can engage the backside of the bar and slide it on the base and into contact with the back edge of the blade B, as clearly shown in FIGURE 5.

The conventional wipe blade holder C is comprised of upper and lower complementary clamping members 20 and 21, respectively, which are tightly but releasably held together by the bolt means 22 spaced along their length. In turn the member 21 is rigidly secured by the bolt means 5 to the base 1, the bolt means extending through the base and threaded into member 21.

The blade B is clamped between members 20, 21 and has slots 23 (Figure 12) to accommodate the bolt means 22 which extend therethrough. The clamp members are preliminarily tightened together to prevent the blade from buckling, that is, to maintain or hold the blade in a single plane. The blade is of such a width that it extends forwardly from the holder C and also extends rearwardly for contact by the pressure bar 16. A back-up or reinforcing strip 24 lies against the upper side of blade B and is also clamped between members 20 and 21.

As the blade comes from the steel mill, it usually is bowed along its length as shown in FIGURE 12, although the amount of bowing is exaggerated in this view, and the present invention provides for straightening this blade without the removal of any appreciable amount of the original smooth edge of the blade.

A gauge bar 25 shown in FIGURES 1, 2 and 5 is swingably mounted on a member 26 by means of pins 26b which extend through the ears 26c at each end of member 26. Member 26 in turn is rigidly secured to base 1 by cap bolts 26d (FIG. 5). Hand screws 27 extend through bar 25 and threadably engage member 26 to thereby rigidly hold the bar 25 in the position shown in FIGURES 1, 2 and 5, against the smooth and accurately formed front surface 26e of the member 26.

The upper rear corner of the bar 25 is cut away so as to form a surface 28 at a right angle to the blade B and against which the leading edge of the latter is adapted to be pressed by the bar 16 when the screws 13 are appropriately turned. The surface 28 is finished extremely straight and smooth. A hold-down plate 30 is secured by bolts 31 to the top of bar 25 and overhangs surface 28 a small distance. The back-up strip 24 contacts plate 30 which determines the amount of overhang of blade B past the strip 24. The extent to which the blade protrudes beyond its clamp members 20, 21 is variable and is determined by the size and number of washers W which are inserted on bolts 26d. At the top edge 26a of member 26 together with bar 30 thereby acts to guide and rigidify the blade as it is tightly urged against the straight guide surface 28. This pushing action causes the blade to shift within the single plane to which it is confined by the clamp members 20 and 21.

The originally bowed blade B is placed in its holder C, preferably with the concave edge of the blade extending from the front side of the holder for contact with surface 28. The bolts 22 are not tightened completely at this time, and the blade is then urged against surface 28 by tightening the screws 13 and consequently pushing the pressure bar 16 against the back edge of the blade. The screws 13 are adjusted individually and not a great deal of pressure is required to urge the leading, that is the wiping edge of the blade against the guide surface 28. The force on the blade is such as to shift it between the clamping members and straighten it, thereby removing the original camber or other gradual curves along its length. By placing the concave edge against surface 28, the finished leading edge is placed under tension. The bolts 22 are then drawn tight which securely clamps the blade in its straightened position.

In this manner, the blade may be straightened without removing any of the leading edge and, for example, to within 0.002 of an inch variation along its length from being perfectly straight.

After the above straightening operation, it is necessary to form an angle on the wiping edge as shown in FIGURE 6. As indicated, when this angle has been formed the finished leading edge is often 0.002 of an inch thick. This angle and leading edge thickness must be uniform across the length of the blade in order that as the blade wears, the angle of the blade remains substantially constant across its length and thereby requires less frequent refinishing. In other words, as the cylinder 33 wears the blade back as indicated by the dotted lines in FIGURE 6, the included angle of the blade edge remains uniform across the blade length.

The honing operation of the blade to produce the required uniform angle is accomplished by using the same straight surface of the apparatus as was used to mount the guide bar 25 for straightening, and without removing the blade from the holder or base, as follows.

To convert from the straightening to the honing operation, the hand screws 27 are first removed and the bar 25 is swung 180 degrees about its pivot pins 26b from the position shown in FIGURES 1, 2 and 5 to the position shown in FIGURE 3. In the latter position the smooth and accurately formed surface 26f faces upwardly and at a right angle to surface 26e, and the bar 25 bears firmly against surface 26e without the use of screws 27.

As shown in FIGURE 3, a honing block HC is adapted to be pushed by hand along the straight and smooth surfaces 26e and 26f and is held firmly thereagainst as the honing stone S is drawn lightly across the vertical leading portion of the blade edge. The honing block is reversible against surfaces 26e and 26f so that its angularly disposed stone S1 can form the desired angle (FIGURE 6) along the blade edge. The operating position of the stones in relation to the blade is accurately predetermined to provide for the proper amount of honing action.

In the above method of straightening a conventional wipe blade, the blade is held relatively loosely in its fixed holder and extends from the front side thereof. The blade has been shown as also extending outwardly from the rear side of the holder, but of course this is not necessary. For example, the rear edge of the blade may terminate within the holder so that such a wide blade need not be provided. In that case an adjustable guide surface would be located between the clamping members, such as for example, adjustable pegs located in slots in the members 20 and 21.

In any event, pressure is then exerted on the rear edge of the blade which causes the blade to shift within its plane defined by its clamp members, and the blade leading edge is pushed tightly against the straight guide surface. The holder is then clamped tightly on the blade to hold it in the straight position. The honing stones are then referenced to the same straight guide surfaces which supported the guide bar, and accurate finishing at the proper angle is assured.

Reference is now being made particularly to FIGURES 7 to 11, inclusive, in which the invention is shown as applicable to a reverse wipe type of blade. When the apparatus is used for this purpose, the bolts 26d (FIGURE 5) are removed so as to remove member 26 and its associated guide bar 25, which assembly is not used for the reverse wipe blade operations as shown in FIGURES 7–10a. Then the bolts 12a are removed from the base as shown in FIGURE 5, and the member 12 is secured to the underside of base 1, as shown in FIGURE 9, by these same bolts 12a which are threadably engaged in the base. In other words, the member 12, and its associated pressure bar 16 are removed from the rear of the base as shown in FIGURE 5, turned end-for-end, and then secured to the lower front side of the apparatus as shown in FIGURE 9. As previously indicated, when screws 2a are loosened, the base may, if desired, be rotated 90 degrees, and the screws then retightened. This new position (not shown) may be more convenient for the operator to work on the reverse type blade.

It will be noted that the pressure bar 16 has an undercut portion 16a which forms a shoulder against which the reverse wipe blade BR is steadied while being straightened.

It will also be noted that when the device is used as shown in FIGURES 7 to 10a, the surface 12b of member 12 extends at a right angle beyond surface 8 of the base, and that surface 12c of the member extends at a downwardly inclined angle therefrom.

The holder R is comprised of a plate 40 to which the clamping plate 41 is securable by bolts 42. The plate 40 is cut away at 43 to define an opening with member 41, into which opening the blade BR is mounted in the resilient backing material 44. When bolts 42 are tightened, the blade is rigidly held in position. However, these bolts are not finally tightened until the blade has been pushed into a straight position as follows.

The plate 40 is rigidly securable to base 1 by the bolt means 5 which extend upwardly through the base 1 and are threadably engaged in the plate 40. The blade extends downwardly from its holder and along the front side of the base 1.

When the thumb screws 13 are appropriately turned, they act to bear against the bar 16 to urge it upwardly into engagement with the downwardly extending blade edge. More particularly, the blade edge is contacted by the straight surface 16a and bears against the adjacent shoulder. Bar 16 now acts as a straight guide member which is urged against the leading edge of the reverse wipe blade, and further acts as a pressure bar to push it into straight position.

As the screws 13 are individually tightened to shift the blade firmly against the straight guide edge 16a, the resilient material 44 yields sufficiently to accommodate movement of the blade BR. When the blade has thus been straightened, the bolts 42 are tightened completely, thereby clamping the blade firmly in place.

The blade BR is then ready to be honed. Screws 13 are backed off bar 16 and the latter is swung outwardly (FIG. 8) and to a downwardly hanging position. As shown in FIGURE 10, a honing block HR is then held against surfaces 8 and 12b so that its stone SR bears lightly against the blade edge and normal thereto, as the block is moved along its guide surfaces. Another stone SR 1 (FIG. 10a) has an inclined surface 49 and is used for forming the angle on the blade edge. The stones may be suitably shimmed in their blocks to afford proper pressure on the blade. As seen in FIGURE 11, the angle formed on the reverse wipe blade should be such in relation to the cylinder 33 to permit foreign matter to escape past the blade and without building up between the cylinder and blade.

In the form of the invention shown in FIGURES 7 to 11, the leading edge of the blade extends from its holder and the blade is held firmly but sufficiently loose to permit shifting therein. The pressure applying, straight guide surface 16a then bears against the blade to push it into a straight position, whereupon the holder is tightly clamped on the blade to hold the latter in a straight position, and the blade is then finely honed at the proper angle.

Various modes of carrying out the invention are contemplated as being within the scope of the following claims particularly pointing out and distinctly claiming the subject matter which is regarded as the invention.

What is claimed and desired to be secured by Letters Patent is:

1. A method of straightening a long, flexible doctor blade comprising the steps of preliminarily clamping the blade on opposite sides so as to hold it in a single plane and yet permitting it to shift within said plane when sufficient pressure is applied thereto, providing a straight guide surface adjacent one of the blades longitudinal edges, urging said surface and edge relatively together with sufficient pressure to force said edge to conform to said straight surface, and tightly clamping said blade in straightened position.

2. A method of straightening a long, flexible doctor blade having a front wiping edge and a rear edge, preliminarily clamping the blade on opposite sides so as to hold it in a single plane and yet permitting it to shift within said plane when sufficient pressure is applied thereto, providing a straight guide surface adjacent said wiping edge, applying pressure to the rear edge to thereby shift said blade and urge said wiping edge against said surface, and tightly clamping said blade in straightened position.

3. A method of straightening a long, flexible doctor blade having a wiping edge, said method comprising the steps of preliminarily clamping the blade on opposite sides so as to hold it in a single plane and yet permitting it to shift within said plane when sufficient pressure is applied thereto, providing a straight guide surface adjacent said wiping edge, urging said surface against said edge with sufficient pressure to force said edge to conform to said straight surface, and tightly clamping said blade in straightened position.

4. A method of straightening and honing a long, flexible doctor blade having a wiping edge, said method comprising the steps of preliminarily clamping the blade on opposite sides so as to hold it in a single plane and yet permitting it to shift within said plane when sufficient pressure is applied thereto, providing a straight mounting surface adjacent said edge, mounting a straight guide bar on said surface for contact with said edge, urging said bar and edge relatively together with sufficient pressure to force said edge to conform to said straight bar, tightly clamping said blade in straightened position, removing said guide bar, and passing a honing stone over said edge while using said mounting surface as a reference surface therefor.

5. A method of straightening and honing a long, flexible doctor blade having a wiping edge and a rear edge, said method comprising the steps of preliminarily clamping the blade on opposite sides so as to hold it in a single plane and yet permitting it to shift within said plane when sufficient pressure is applied thereto, providing a straight mounting surface adjacent said wiping edge, mounting a straight guide bar on said surface for contact with said wiping edge, applying pressure to said rear edge to cause said blade to shift in said plane and said wiping edge to bear firmly against said bar, tightly clamping said blade in straightened position, removing said guide bar, and passing a honing stone over said wiping edge while using said mounting surface as a reference surface therefor.

6. A method of straightening and honing a long, flexible doctor blade having a wiping edge, said method comprising the steps of preliminarily clamping the blade on opposite sides so as to hold it in a single plane and yet permitting it to shift within said plane when sufficient pressure to shift the blade in said plane and force said surface adjacent said wiping edge, mounting a straight guide bar on said surface for contact with said wiping edge, urging said bar against said edge with sufficient pressure to shift the blade in said plane and force said edge to conform to said straight surface, tightly clamping said blade in straightened position, removing said bar, and slidably mounting a honing tool on said surface and passing it over said edge for honing the latter while using said surface as a guide surface for said tool.

7. A set-up fixture for straightening doctor blades, comprising in combination, a pair of complementary clamping members for holding a flexible blade therebetween, said blade having a wiping edge extending outwardly from said clamping members, a base to which said clamping members are rigidly securable, a guide bar mountable on said base and having a straight surface adapted to contact said wiping edge, pressure means for forcing said wiping edge and said straight surface together whereby said blade is shifted in its clamping members and said wiping edge assumes a straight position as defined by said surface, and means for tightly holding said clamping members together.

8. A set-up fixture for straightening doctor blades, comprising in combination, a pair of complementary clamping members for holding a flexible blade therebetween, said blade having a wiping edge and a rear edge extending outwardly from said clamping members, a base to which said clamping members are rigidly securable, a guide bar fixedly mountable on said base and having a straight surface adapted to be contacted by said wiping edge, shiftable pressure means for contacting said rear edge and forcing said blade to be shifted in said clamping members and said wiping edge to bear against said guide bar and assume a straight position as defined by said surface, and means for tightly holding said clamping members together to prevent blade movement.

9. A set-up fixture for straightening doctor blades, comprising in combination, a pair of complementary clamping members for holding a flexible blade therebetween, said blade having a wiping edge extending outwardly from said clamping members, a base to which said clamping members are rigidly securable, a guide bar shiftably mounted on said base and having a straight surface adapted to contact said wiping edge, pressure means for shifting said bar and forcing said straight surface against said wiping edge whereby said blade is shifted in said clamping members and said wiping edge assumes a straight position as defined by said surface, and means for tightly holding said clamping members together.

No references cited.